United States Patent Office 2,766,971
Patented Oct. 16, 1956

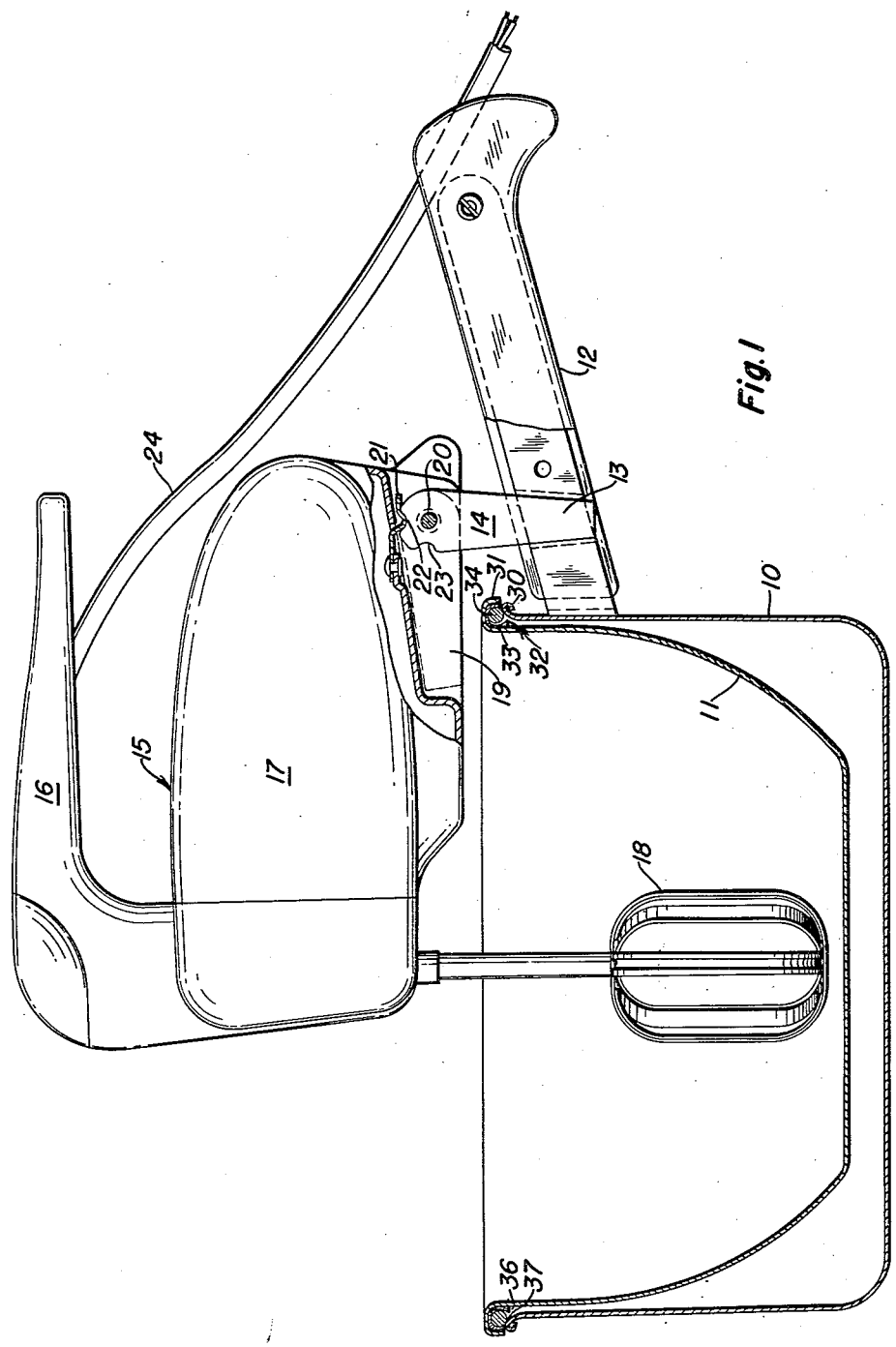

2,766,971

FOOD MIXERS

John E. Vance and Melvin H. Ripple, Canton, Ohio, assignors to The Hoover Company, North Canton, Ohio, a corporation of Ohio Application March 10, 1954, Serial No. 415,376

6 Claims. (Cl. 259—51)

The present invention relates to food mixers and more particularly to a double-receptacle type of food mixer in which the inner receptacle is rotatably mounted within an outer receptacle which may be used as a double boiler when heat is necessary during the mixing operation or as a receptacle for ice when it is necessary to chill the contents of the inner bowl during the mixing operation.

The present application is an improvement over an application by John E. Vance, Serial No. 249,712, filed October 4, 1951, Patent No. 2,707,622, dated May 3, 1955. The Vance application referred to discloses and claims a double boiler or pan arrangement in which a portable mixer unit is removably mounted on the handle of the outer pan and the inner pan or bowl is rotatably mounted within the outer pan or bowl.

The present invention relates to an improved bearing arrangement by which the inner bowl or pan is rotatably mounted within the outer bowl or pan, in which the bearing for the inner bowl or pan does not come in contact with the contents of either bowl or pan.

Specifically, according to the present invention, an annular bearing structure may rest on the upper edge of the outer bowl or pan, which may be constructed in the manner of an ordinary sauce pan, and in which the annular bearing structure engages an outwardly extending flange formed on the upper rim of the inner bowl or pan.

Other objects and advantages of the present invention will become apparent when taken in connection with the accompanying drawings in which Fig. 1 is a side view of the mixer of the present invention with the two receptacles shown in section;

Figure 3:
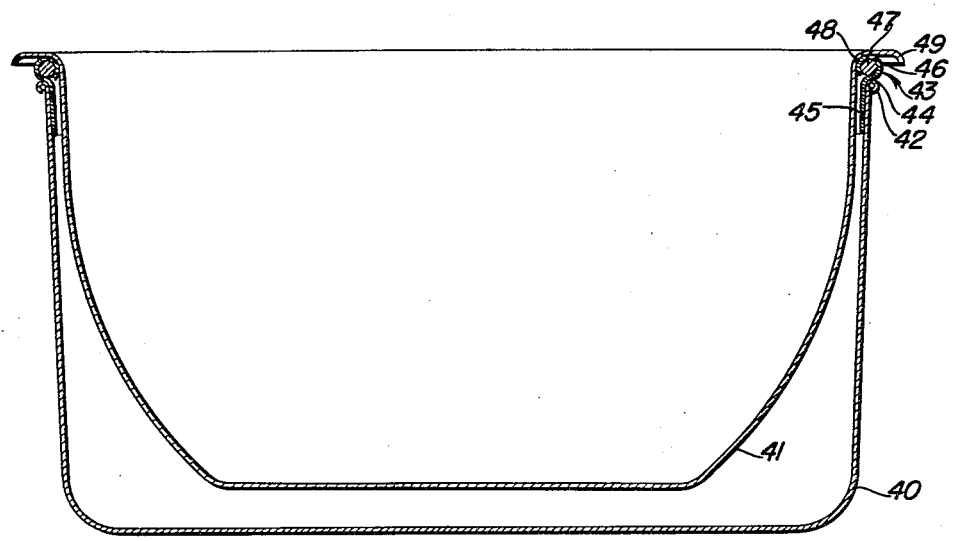
Fig. 3 is a sectional view of the two receptacles showing a modified form of bearing arrangement.

Referring to Fig. 1 of the drawings, the reference numeral 10 represents the outer bowl, pan or receptacle and the reference number 11 the inner one. The outer receptacle 10 is provided with an insulated handle 12 by which the two receptacles may be carried about. The handle 12 is provided with a socket 13 for receiving a supporting leg 14 attached to a portable power mixer generally indicated by the reference numeral 15.

The power mixer unit 15 includes a carrying handle 16 and a casing 17 housing a motor and gearing for driving the mixers 18 as is well known in the art. The casing 17 is formed with a recess 19 in one end in which the support 14 is pivoted as at 20. The support 14 is adapted to be folded into the recess 19 and is held in either extended or folded position by a spring detent 21 which engages notches 22 and 23, respectively, to hold the support 14 in either its extended or collapsed position.

The motor of the mixer unit 15 is supplied with electric current from any suitable outlet by an electric cord 24 and a suitable switch may be provided for energizing the motor.

The portable mixer unit 15 may be independently supported on its heel by the rear end of the handle 16 and the rear end of the casing 17.

The outer pan or receptacle 10 is provided with a curved annular rim 30 which may be formed in the usual manner of forming rims on sauce pans. The inner bowl or pan is provided with a comparatively wide downwardly facing annular groove or recess 31 of substantially the same diameter as the rim 30 of the pan 10 for removably receiving a bearing element generally indicated by the reference numeral 32.

The bearing element 32 comprises an annular inverted U-shaped ball race 33 containing a plurality of trapped ball bearings 34 distributed entirely around the interior of the race 32, the race 32 having an opening 36 smaller than the balls 34 whereby the latter may contact with the upper circular edge 37 of the rim 30 of the outer receptacle. The annular race 32 is detachably positioned within the annular recess 31 of the inner receptacle 11 whereby it may be easily removed for cleaning purposes.

Figure 4:
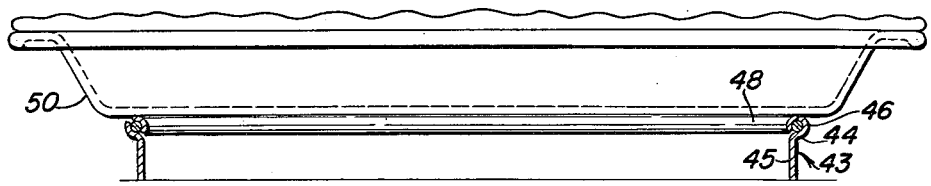
Fig. 4 shows how the bearing arrangement of Fig. 3 may be used as a turntable independently of the two receptacles.
Figure 2:
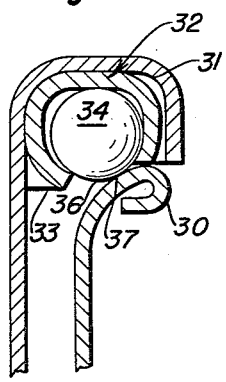
Fig. 2 is a segmental sectional view through the rims of the receptacles of Fig. 1 and the bearing showing how the inner pan is rotatably mounted on the rim of the outer pan.

The modification of Figs. 3 and 4 comprises an outer receptacle or pan 40 and an inner bowl or pan 41. The pan 40 is provided with an annular rolled edge 42 commonly formed on the rims of many cooking utensils. The detachable, removable bearing unit 43 is provided with an annular shoulder 44 formed to engage the rim 42 of the outer receptacle 40 and with a downwardly extending annular ring 45. The shoulder 44 and annular ring 45 provide a support for the bearing unit 43 on the receptacle 40 as shown in Fig. 3.

Above the shoulder 44 the annular ring 45 is formed with a bearing race 46 for trapping an annular ring of ball bearings 47 between the race 46 and a complementary race 48, the race 48 being engaged with the outwardly extending rim 49 of the inner receptacle 41 as will be explained.

The arrangement of the races 46 and 48 is such that the ball bearings 47 are trapped between the two races.

The bearing elements 43 of Fig. 3 is also adapted to be used as a turntable for general culinary uses, as shown in Fig. 4, where a pie pan 50 is supported on the inner race 48 and the rim 45 supports the turntable 43 on any flat supporting surface.

In the modification of Fig. 3, the outer receptacle 40 may be provided with a carrying handle, as in the modification of Fig. 1, upon which the mixer unit 15 may be mounted as shown in Fig. 1.

Operation

If it is desired to heat the material being mixed during the mixing operation, water is placed in the outer receptacle 10 or 40 and heat applied in any suitable manner during the mixing operation.

In either modification, if it is desired to cool the material being mixed, crushed ice or crushed ice and water is placed in the outer receptacle.

In the modification of Fig. 1, after the water or ice is placed in the outer receptacle 10, the material to be mixed is placed in the inner receptacle 11 or it may be poured into the receptacle 11 after the parts are assembled as shown in Fig. 1.

In either case, the bearing assembly 32 is placed on top of the rim 30 of the outer receptacle 10 with the balls 34 in engagement with the upper surface of the rim 30. The inner receptacle 11 is then placed inside the outer receptacle 10 with the inverted U-shaped annular flange 31 engaging over the race 33 of the annular bearing 32.

The support 14 of the mixer unit 15 may then be inserted into the socket 13 of the handle 12, with the mixers 18 extending downwardly into the inner receptacle as shown in Fig. 1. The motor of the mixer unit 15 may then be energized so that the mixers 18 are rotated in the usual manner.

The mixers 18 may be so related to the walls of the receptacle 11 that the reaction between the mixers 18 and the material being mixed will automatically rotate the inner bowl 11 within the outer bowl 10 or the inner bowl 11 may be manually rotated within the outer bowl 10 during the mixing operation.

The operation of the modification of Fig. 3 is substantially the same as that of Fig. 1 except that the removable bearing ring 43 may be used independently of the receptacle as a turntable of general utility, for example for use in applying the crusts to pies 50, as shown in Fig. 4.

In either modification, the mixer may be used in the ordinary manner, either by removing the inner receptacle and bearing unit entirely or by using the inner receptacle without applying a heating or cooling medium in the outer receptacle.

From the foregoing it is apparent that the present invention provides a double-receptacle mixer which may be used as a double boiler for heating the material being mixed, which may be used to chill the material being mixed, or which may be used in the manner of an ordinary mixer without either heating or chilling and in which the inner bowl is rotatably mounted on the outer bowl by an annular bearing ring removably mounted on the rim of the outer bowl and rotatably engaging the flange on the inner bowl.

While we have shown and described but two embodiments of our invention, it is to be understood that those embodiments are to be taken as illustrative only and not in a limiting sense. We do not wish to be limited to the specific structures shown and described but wish to include all equivalent variations thereof except as limited by the scope of the claims.

We claim:

1. A portable mixer of the type having an inner bowl or receptacle rotatably mounted within an outer bowl or receptacle, that improvement which comprises a detachable self-contained annular bearing ring resting on and detachable from the rim of the outer bowl or receptacle and detachably engaging an annular flange on the upper edge of the inner bowl or receptacle to rotatably support the inner bowl or receptacle within the outer bowl or receptacle.

2. In a food mixer according to claim 1 in which said annular bearing ring includes a ball bearing race detachably engaging and rotatable with the outwardly extending flange of the inner bowl or receptacle.

3. In a food mixer according to claim 2 including ball bearings in said race which directly engage and roll upon the annular rim of said outer bowl or receptacle.

4. In a food mixer according to claim 2 including a second ball bearing race detachably mounted on the annular rim of said outer bowl or receptacle, and ball bearings trapped between said races whereby said inner bowl or receptacle is rotatably mounted on the annular rim of said outer bowl or receptacle.

5. In a food mixer according to claim 4 wherein said second ball bearing race includes a downwardly extending annular flange to fit interiorly of the upper annular rim of said outer bowl or receptacle.

6. In a food mixer according to claim 5 in which said downwardly extending annular flange extends downwardly appreciably from said annular bearing race so as to form a support therefor whereby said race may be supported on a flat support and thus form a turntable of general utility.

References Cited in the file of this patent

UNITED STATES PATENTS

| | | |
|---|---|---|
| 1,295,648 | Bouquin | Feb. 25, 1919 |
| 2,237,859 | Bille | Apr. 8, 1941 |

FOREIGN PATENTS

| | | |
|---|---|---|
| 524,346 | Germany | May 6, 1931 |